United States Patent
Leidig et al.

(10) Patent No.: US 9,638,358 B2
(45) Date of Patent: May 2, 2017

(54) DUCT ELEMENT FOR THE EXHAUST SYSTEM OF A MOTOR VEHICLE

(71) Applicant: Witzenmann GmbH, Pforzheim (DE)

(72) Inventors: Hans-Jurgen Leidig, Muhlacker (DE); Bernd Seeger, Pforzheim (DE)

(73) Assignee: Witzenmann GmbH, Pforzheim (DE)

( * ) Notice: Subject to any disclaimer, the term of this patent is extended or adjusted under 35 U.S.C. 154(b) by 377 days.

(21) Appl. No.: 14/173,887

(22) Filed: Feb. 6, 2014

(65) Prior Publication Data

US 2014/0216590 A1 Aug. 7, 2014

(51) Int. Cl.
| | |
|---|---|
| *F16L 11/14* | (2006.01) |
| *F16L 11/15* | (2006.01) |
| *F16L 55/033* | (2006.01) |
| *F01N 13/16* | (2010.01) |

(52) U.S. Cl.
CPC .............. *F16L 11/14* (2013.01); *F01N 13/16* (2013.01); *F16L 11/15* (2013.01); *F16L 55/0337* (2013.01); *F01N 2530/02* (2013.01); *F01N 2530/04* (2013.01)

(58) Field of Classification Search
None
See application file for complete search history.

(56) References Cited

U.S. PATENT DOCUMENTS 5,645,109 A * 7/1997 Herrero ................. F16L 11/082
138/130

FOREIGN PATENT DOCUMENTS

| DE | 102007060133 | | 6/2009 |
|---|---|---|---|
| WO | WO2012092931 | * | 7/2012 |

* cited by examiner

*Primary Examiner* — Daniel J Schleis
(74) *Attorney, Agent, or Firm* — Volpe and Koenig, P.C.

(57) ABSTRACT

A duct element for the exhaust system of a motor vehicle with an internal combustion engine, including at least one flexible duct part, preferably a bellows. The flexible duct part is embodied at least partially from a first type of steel with a Mo-content ≥4% or ≥6% and with a N-content from 0.3% to 0.6% or from 0.18% to 0.25%, preferably embodied from steel of the type 1.4565 or the type 1.4547. Furthermore a decoupling element is provided for motor vehicles with an internal combustion engine and a respective use of steel embodied with a Mo-content ≥4% or ≥6% and a N-content from 0.3% to 0.6% or from 0.18% to 0.25%, preferably steel of the type 1.4565 or 1.4547.

12 Claims, 1 Drawing Sheet

DUCT ELEMENT FOR THE EXHAUST SYSTEM OF A MOTOR VEHICLE

The following documents are incorporated herein by reference as if fully set forth: German Patent Application No. 102013201993.9, filed Feb. 7, 2013.

BACKGROUND

The invention relates to a duct element for the exhaust system of a motor vehicle with an internal combustion engine, which duct element comprises at least one flexible duct part, preferably a metallic annular corrugated hose or bellows. Within the scope of this description the term "exhaust system" includes not only exhaust ducts but explicitly also exhaust return lines, unless specified otherwise.

Additionally the invention relates to a decoupling element for motor vehicles with an internal combustion engine, preferably for exhaust ducts or exhaust return lines as well as the use of certain materials.

Commonly stainless austenitic steel, preferably so-called standard austenite is used, e.g., the materials 1.4301, 1.4541, or 1.4571 (which are commonly known stainless steel types having specified weight percentages (wt %) for their components, including Fe, C, Mn, Si, P, S, Cr, Ni, and N) for decoupling elements used in exhaust systems of motor vehicles with internal combustion engines in order to decouple oscillations induced by the internal combustion engine from other components of the exhaust system. On the one hand, duct elements used in this area must tolerate high thermal stress due to the temperature of the exhaust flow passing through them, and on the other hand, they must be particularly resistant to corrosion at least at their exterior, because during use in and/or on motor vehicles such duct elements are exposed to moisture and other corrosive media, particularly brine.

To the extent that constituent components of steel are referred to herein in connection any specified steel grades, they are weight percentages in accordance with standard practice in the steel industry.

Accordingly it is known in prior art to use nickel based materials, e.g., 2.4856, for the exhaust system of a motor vehicle at least for the exterior sections of duct elements. In this way, a particularly high corrosion resistance is yielded, however it is disadvantageous here that nickel-based materials are much more expensive than the standard austenite mentioned at the outset.

Due to the fact that the corrosion resistance of standard austenite, for example 1.4571, is insufficient for certain purposes of use an interim solution seems desirable in many applications, in which both the price as well as the corrosion resistance of the material ranges between the respective values for the materials 1.4571 and 2.4856. In order to attain this objective, in the past steel manufacturers have become active and developed specific alloys and applied for patent protection. This relates to the materials Incoloy 864 and Incoloy 865 of Special Metals as well as the materials 332Mo and 334Mo of Allegheny.

In this context it has been shown to be disadvantageous, however, that the price-benefit ratio of the above-mentioned steel developments Incoloy 864/865, 332Mo, and 334Mo is relatively unfavorable. Additionally, repeated price increases or supply problems have occurred in the past due to the strictly limited supply situation.

SUMMARY

The invention is based on the objective of providing a duct element and/or a decoupling element of the type mentioned at the outset, which is characterized in that it can be formed from an alloy globally available, if possible from more than one steel manufacturer, with its price maximally being in the middle between the prices for the materials 1.4571 and 2.4856, with here the corrosion resistance being considerably better than the one of the material 1.4571. This way the above-mentioned disadvantages with regards to the procurement situation, the production costs, as well as the corrosion resistance shall be avoided.

The above-mentioned objective is attained by a duct element with one or more features of the invention, as well as a decoupling element and an application with one or more features of the invention. Advantageous further developments are noted below an in the claims.

The duct element according to the invention for exhaust systems of a motor vehicle with an internal combustion engine comprising at least one flexible duct part, preferably in the form of bellows, is characterized such that the flexible duct part is made at least partially from a first type of steel with a Mo-content ≥4% or ≥6% and is embodied with a N-content from 0.3% to 0.6% or from 0.18% to 0.25%, preferably steel of the type 1.4565 or the type 1.4547. Here, the "Mo-content" represents the content of molybdenum and the "N-content" the content of nitrogen in the steel. According to the invention both the Mo-content and the N-content are relatively high.

The decoupling element according to the invention for motor vehicles with an internal combustion engine, preferably for exhaust systems or exhaust return lines, is characterized in a duct element according to the invention.

The application according to the invention relates to the use of steel formed with a Mo-content ≥4% or ≥6% and with a N-content from 0.3% to 0.6% or from 0.18% to 0.25%, preferably steel of the type 1.4565 or 1.4547, for the production of components for a duct element or a decoupling element for the exhaust system of a motor vehicle with an internal combustion engine, preferably a flexible duct part, most preferably a bellows.

The applicant has determined in extensive experiments that particularly the materials 1.4565 and 1.4547 mentioned fulfill the above-stated requirements. According to the knowledge of the applicant these materials have not been used in the past nor are they used today for duct elements and/or decoupling elements for the exhaust system of motor vehicles, particularly not for the flexible, thin-walled duct parts used here, because the respective suitability has previously not been recognized.

The suggested materials offer higher costs to a comparatively minor extent in reference to standard austenite with a considerably increased resistance to corrosion. For this reason the parts produced therefrom show a longer life span, which increases customer satisfaction, on the one hand, and contributes to saving resources, on the other hand, by avoiding discards.

The suggested materials, particularly 1.4565, known per se are hardly used today, though. However it is novel in any case to use them in the manner suggested in the present application for patent protection.

A first further development of the duct element according to the invention provides that the flexible duct part is embodied in several layers comprising an internal layer and an external layer and perhaps additional intermediate layers. Here it may be provided that at least the exterior layer of the flexible duct part is embodied from a first type of steel, in order to increase the corrosion resistance against exterior damaging influences in this area.

Another further development of the duct part according to the invention may provide that the internal layer is embodied from a second type of steel, because with regards to the internal layer the resistance to corrosion is frequently of only minor importance. The second type of steel mentioned may represent a steel with a relatively low nickel content, as disclosed for example in DE 10 2007 060 133 A1. Alternatively particularly the internal layer may also be made from a different material, for example standard austenite, preferably 1.4301, 1.4541, or 1.4571. The same applies in general also to any potential intermediate layers.

A further development of the decoupling element according to the invention provides that here at least one additional component, preferably an exterior component, is embodied from the first type of steel, most preferably a web or mesh material surrounding the flexible duct part, in order to here increase the resistance to corrosion in a targeted fashion with only minor additional costs.

BRIEF DESCRIPTION OF THE DRAWINGS

Additional features and advantages of the invention are discernible from the following description of exemplary embodiments, based on the drawing.

DETAILED DESCRIPTION OF THE PREFERRED EMBODIMENTS

Figure 1:
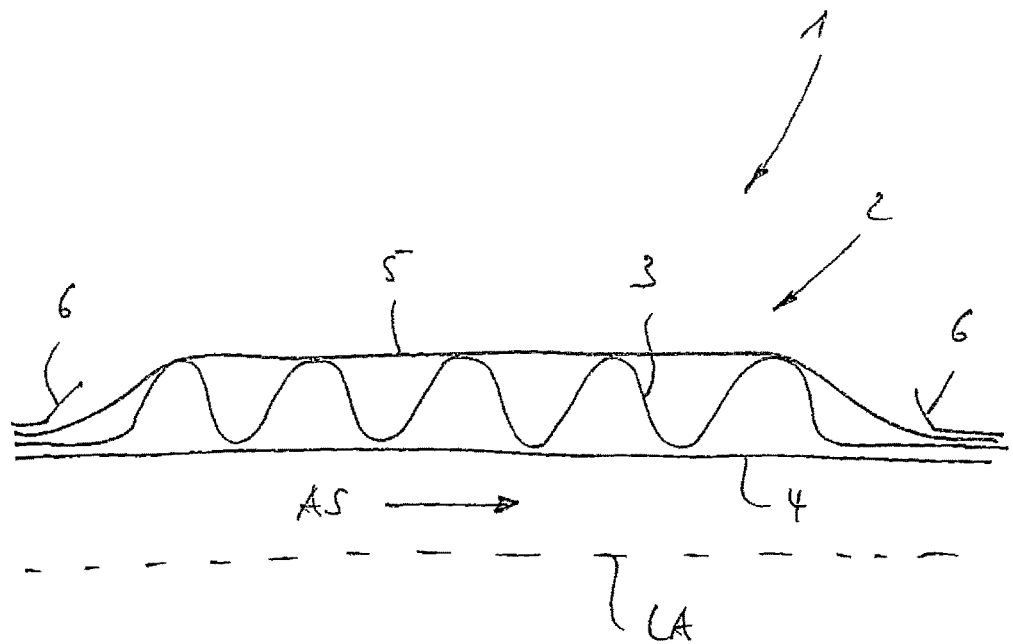
FIG. 1 shows in a longitudinal cross-section a detail of a decoupling element with a duct element according to the invention.

FIG. 1 shows schematically a longitudinal cross-section of a decoupling element 1 for motor vehicles with an internal combustion engine, preferably for exhaust ducts or exhaust return lines. The reference character AS marks the exhaust flow guided inside the decoupling element 1, while the reference character LA marks the longitudinal axis of the decoupling element 1. The decoupling element 1 is embodied rotary symmetrical in reference to the longitudinal axis LA.

The decoupling element 1 comprises a duct element 2, which is embodied in the present case as a largely flexible duct part in the form of a bellows 3. Furthermore, the decoupling element 1 comprises in a manner known per se an internal component 4, arranged inside the bellows 3, for example a wound hose or liner, as well as an external component 5 arranged radially outside the bellows 3, for example a web or mesh material. The joint connection of the bellows 3, the internal component 4, and the external component 5 occurs at the end in the area of end sheaths 6, for example by way of welding and/or compressing. The decoupling element 1 according to the invention is not limited to the above-described exemplary embodiment, though.

In the present case the bellows and/or the flexible duct part 3 is embodied from a particular metallic material of the type 1.4547 or 1.4565 such that the flexible duct part 3 shows resistance to corrosion, rendering it suitable for the use in the exhaust system of motor vehicles without this being connected to any relevant disadvantages with regards to production costs and/or the procurement situation. In general, additional components of the decoupling element 1 may be embodied from one of the above-mentioned materials, particularly the external component 5 and/or the end sheaths 6, which perhaps come in contact with corrosive media. In particular the internal component 4, but also additional components of the decoupling element 1, except for the flexible duct part 3, may be made from other materials within the scope of the present invention, for example the already mentioned standard austenite or so-called low-nickel materials, such as disclosed in DE 10 2007 060 133 A1.

Figure 2:
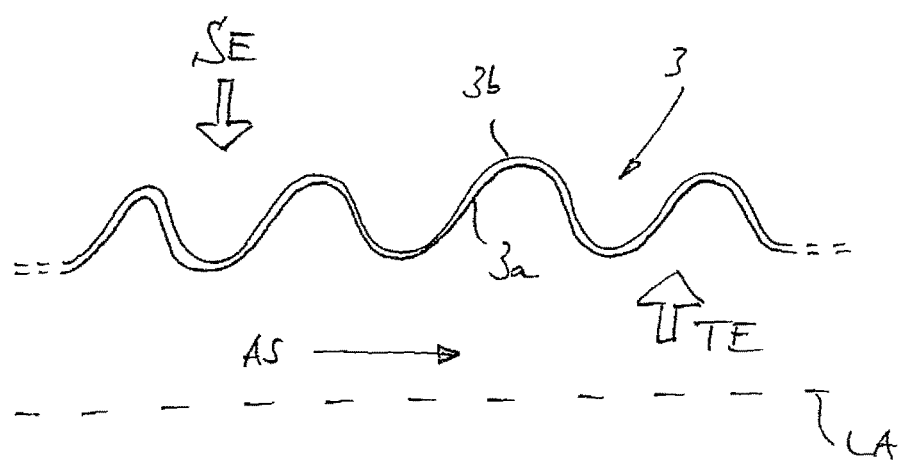
FIG. 2 shows in a longitudinal cross-section a detail of a flexible duct part embodied with several layers.

FIG. 2 shows schematically in a longitudinal cross-section a particular design of the flexible duct part 3, which may be used in the decoupling element 1 according to FIG. 1.

According to FIG. 2 the flexible duct part 3 is embodied in several layers and comprises an internal layer 3a as well as an external layer 3b. One or more intermediate layers may be arranged between the internal layer 3a and the external layer 3b, which is not shown in FIG. 2. The two block arrows in FIG. 2 symbolize, on the one hand, a damaging influence (SE) acting upon the exterior layer 3b, for example in the form of corrosive media, such as moisture and/or brine, e.g., from the seasonal use of deicing salt. The other block arrow TE symbolizes the temperature influence of the exhaust flow AS initially acting upon the internal layer 3a, with the temperature influence TE being active due to the close connection of the internal layer 3a and the external layer 3b also in the area of the external layer 3b, of course.

In the embodiment according to FIG. 2 preferably only the external layer 3b, directly exposed to the damaging influence SE, is made from the material 1.4565 or 1.4575. However, the internal layer 3a may preferably be made from a different material, such as the above-mentioned standard austenite or a low-nickel material, in order to yield optimal costs during the production. The same also applies for potential intermediate layers (not shown).

A saline bath test was conducted with tape samples of several of the above-stated materials which were tested over 60 cycles and at a temperature of 650° C. After the tape samples were heated in an oven at 650° C. for 30 minutes and subsequently cooled for 10 minutes a one minute immersion in brine with a 5%-concentrated deicing salt-solution occurred. The subsequently measured remaining wall thickness was stated in percent of the original tape thickness. The alloy surcharge in Euros per kilo to be paid when procuring the materials was compared (status: January 2011).

The materials 1.4547 and 1.4565, suggested within the scope of the present invention, proved to be even better with regards to corrosion resistance (residual wall thickness as high as possible) than the special steel developments Incoloy 864/865 and 332Mo/334Mo mentioned in the introductory part. Here, they shall be considered at least equivalent to the above-mentioned steel developments with regards to the alloy surcharge, which should be as low as possible. Compared to the standard austenite 1.4571, here also a clearly increased residual wall thickness results with only slightly increased alloy surcharges. Only the above-mentioned nickel-based material 2.4856 proves better with regards to the above-mentioned residual wall thickness, however it shows a value for the alloy surcharge, which is increased by more than a factor of 2.

In particular the material 1.4565, but also the material 1.4547 are therefore particularly suitable for the above-stated use in the field of exhaust systems of motor vehicles. Here, particularly the material 1.4565 has been known per se for a long time, however not for the application in the field of exhaust systems and/or for the production of decoupling elements.

The invention claimed is:

1. An exhaust system for a motor vehicle, comprising a duct element (2) adapted to be connected to an exhaust outlet of an internal combustion engine, the duct element (2) comprising at least one flexible duct part (3) embodied at least partially from a first type of steel with a Mo-content ≥4 wt % and with a N-content from 0.3 wt % to 0.6 wt % or from 0.18 wt % to 0.25 wt %.

2. The duct element of claim 1, wherein the steel comprises type 1.4565 or type 1.4547 steel.

3. The duct element (2) according to claim 1, wherein the flexible duct part (3) includes an internal layer (3a) and an external layer (3b), and at least the external layer (3b) is embodied from the first type of steel.

4. The duct element (2) according to claim 3, wherein the internal layer (3a) is embodied from a second type of steel with a relatively low nickel content relative to the first type of steel of the external layer.

5. The duct element of claim 4, wherein the second type of steel is a standard austenite.

6. The duct element of claim 5, wherein the second type of steel is type 1.4301, 1.4541, or 1.4571 steel.

7. The duct element of claim 1, wherein the at least one flexible duct part (3) is a bellows.

8. The duct element of claim 1, wherein the first type of steel has the Mo-content ≥6 wt %.

9. A motor vehicle with an internal combustion engine, comprising the exhaust system according to claim 1.

10. The decoupling element (1) according to claim 9, wherein at least one additional component of the decoupling element (1) is embodied from the first type of steel.

11. The decoupling element (1) according to claim 10, wherein the at least one additional component comprises a web or mesh cover (5) surrounding the flexible duct part (3).

12. A decoupling element for an exhaust system of a motor vehicle, comprising steel having a Mo-content ≥4 wt % and with a N-content from 0.3 wt % to 0.6 wt % or from 0.18 wt % to 0.25 wt %.

* * * * *